United States Patent [19]

Oriel et al.

[11] 4,264,748

[45] Apr. 28, 1981

[54] EPOXY RESIN COATING COMPOSITIONS

[75] Inventors: Sharon L. Oriel; Nancy B. Tefertiller; John W. Bozzelli; Thomas W. Regulski, all of Midland, Mich.

[73] Assignee: The Dow Chemical Company, Midland, Mich.

[21] Appl. No.: 116,371

[22] Filed: Jan. 28, 1980

[51] Int. Cl.$^3$ ............................................. C08L 63/00
[52] U.S. Cl. ...................................... 525/109; 525/111
[58] Field of Search ................................ 525/109, 111

[56] References Cited

U.S. PATENT DOCUMENTS

| | | | |
|---|---|---|---|
| 2,718,516 | 9/1955 | Bortwick | 526/312 |
| 2,821,544 | 1/1958 | Holtschmidt | 526/312 |
| 3,538,185 | 11/1970 | Davis | 260/837 |
| 3,719,629 | 3/1973 | Martin | 260/33.2 EP |
| 3,928,299 | 12/1975 | Rosewkrawz | 260/89.5 N |
| 4,099,638 | 7/1978 | Tatsuial | 215/12 R |

FOREIGN PATENT DOCUMENTS 1252099  11/1971  United Kingdom .

OTHER PUBLICATIONS

Lee et al.; Handbook of Epoxy Resins, McGraw-Hill (1967) pp. 15-9 to 15-12.

*Primary Examiner*—Paul Lieberman

[57] ABSTRACT

Curable compositions containing (1) an epoxy resin containing a plurality of active hydrogens and (2) and addition polymer of an isocyanatoalkyl ester of an α, β-ethylenically unsaturated carboxylic acid such as 2-isocyanatoethyl methacrylate are usefully employed as coatings for metal substrates and in other applications which require hard surface coatings exhibiting resistance to chemicals and light.

7 Claims, No Drawings

EPOXY RESIN COATING COMPOSITIONS

BACKGROUND OF THE INVENTION

This invention relates to curable epoxy resin compositions which are cured with a vinyl polymer hardening agent having pendant isocyanatoalkyl ester groups.

Coatings based on epoxy resins provide good solvent resistance, hardness, adhesion and the like and are therefore widely used as coatings for a wide variety of substrates such as metal, wood, plastic and the like. Unfortunately, however, such coatings are noted for their tendency to yellow and chalk when exposed to ultraviolet light and other weathering conditions.

This yellowing tendency is particularly evident when amines, such as diethylenetriamine and the like, are used as curing agents. Accordingly, epoxy resin compositions, wherein the problems of yellowing, chalking and other deterioration caused by exposure to light are minimized, have been pursued by the coating industries for a substantial period of time.

In view of the aforementioned deficiencies of conventional epoxy resin compositions and the desire of the coating industries to employ epoxy resin compositions free from such deficiencies, it is highly desirable to provide a hard, adhesive, solvent-resistant coating based on an epoxy resin which exhibits increased resistance to degradation upon exposure to ultraviolet light and other conditions common to the environment.

SUMMARY OF THE INVENTION

In one aspect, the present invention is a curable composition comprising (1) an epoxy resin containing at least two active hydrogen groups per molecule and (2) an addition polymer (hereinafter called an isocyanate polymer) having a carbon-to-carbon polymeric backbone bearing at least two isocyanatoalkyl ester groups per molecule. The proportions of epoxy resin and addition polymer are such that the composition cures to a water- and hydrocarbon-insoluble solid upon exposure to conditions sufficient to cause the isocyanato groups of the copolymer to react with the reactive hydrogen groups of the epoxy resin.

In another aspect, the present invention is a method for coating substrates such as metal, wood, paper, plastic, glass and the like, by applying a coating composition comprising the aforementioned curable composition to the substrate and, subsequently, curing the coating by subjecting the coated substrate to conditions sufficient to cause reaction of the isocyanato groups with the active hydrogen groups.

In yet another aspect, this invention is the cured material resulting from subjecting the aforementioned curable composition to curing conditions.

In the practice of this invention, quick and complete cure is achieved using a wide range of compositions which are tailored to fit the requirements of the particular coating application, for example, coatings for office furniture, industrial maintenance and metal decorations. The invention provides a single coat system having the desirable properties of coatings normally achieved by first applying an epoxy primer and then a polyurethane topcoat.

Surprisingly, the practice of the present invention yields a nonyellowing coating which neither chalks nor discolors upon exposure to conditions characteristic of the environment. The resulting coatings exhibit superior hardness and chemical resistance that is characteristic of a coating consisting entirely of epoxy resin. Finally, the curable compositions of the present invention that contain non-blocked isocyanates are generally less hazardous to individuals employing the composition in that essentially no toxic by-products or residual materials are released to the environment.

DETAILED DESCRIPTION OF REPRESENTATIVE EMBODIMENTS

A wide variety of epoxy resins may be employed in the practice of this invention. Preferred epoxy resins include the glycidyl polyethers of polyhydric phenols such as aromatic diols represented by the formula:

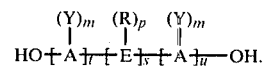

In the formula, A is an aromatic group such as phenylene, biphenylene, naphthenylene, anthracenylene and the like. E is alkylene or alkylidene such as methylene, ethylene, ethylidene, propylene, propylidene, isopropylidene, butylene, butylidene, isobutylidene, amylene, isoamylene, amylidene, and isoamylidene and E may be cycloalkylene such as cyclopentylene or cyclohexylene; a sulfur-containing linkage such as sulfide, sulfoxide or sulfone, an ether linkage; a carbonyl group; a tertiary nitrogen group or a silicone-containing linkage such as silane or siloxy. R is hydrogen or a monovalent hydrocarbon group such as alkyl, aryl, arylalkyl or cycloaliphatic; and Y is chlorine, bromine, fluorine, or R wherein R is defined above. The letter m is any whole number from and including zero through the number of positions on A available for substitution; p is any whole number from and including zero through the number of available positions on E; t is a whole number equal to at least one; s is either zero or one; and u is any whole number including zero. Examples of such dihydric phenols include 2,2-bis-(4-hydroxyphenyl)propane [bisphenol-A]; 2,4'-dihydroxydiphenylmethane; bis-(2-hydroxyphenyl)methane; 1,1-bis(4-hydroxyphenyl)ethane and others including dihydroxy aromatic ethers listed in U.S. Pat. No. 3,169,121 at Column 2, line 60 through Column 3, line 55.

Other polyhydric phenols include resorcinol; catechol; hydroquinone; p,p'-dihydroxydiphenyl; p,p'-dihydroxyphenyl sulfone and the like. These resins of glycidyl polyethers of dihydric phenols are generally made by reacting an epihalohydrin with polyhydric phenol in the presence of a strong base. Typically, these resins contain more than one active hydrogen group per molecule. Preferably, the resin has a HEW in the range from about 250 to about 2,000, most preferably from about 340 to about 800. HEW is defined as the weight in grams of resin which contains one gram equivalent of active hydrogen such as hydroxide, amino and other groups containing a hydrogen atom which, because of its position in the molecule, displays significant activity according to the Zerewitnoff test described by Woller in the *Journal of American Chemical Society*, Vol. 49, page 3181 (1927).

Other epoxy resins which contain more than one, preferably more than two, active hydrogen group(s) per molecule are glycidyl polyethers of polyhydric alcohols, glycidyl polyethers of novolac resins (commonly called epoxy novolacs) and a variety of resins wherein the epoxide group is introduced into the resin by the epoxidization of double bonds. The glycidyl polyethers of dihydric phenols and polyhydric alcohols having equivalent weights from about 500 to about 4,000 and HEW from about 250 to about 2,000 are preferred.

The isocyanate polymers suitably employed as the hardening agent or cross-linking agent in the epoxy resin compositions of the present invention are addition polymers having carbon-to-carbon polymeric backbones which bear at least two isocyanatohydrocarbyl ester groups per polymer molecule. Exemplary polymers include the homopolymers and copolymers of isocyanatoalkyl esters of $\alpha,\beta$-ethylenically unsaturated carboxylic acids such as 2-isocyanatoethyl methacrylate; 2-isocyanatoethyl acrylate; 3-isocyantopropyl methacrylate; 1-methyl-2-isocyanatoethyl methacrylate and 1,1-dimethyl-2-isocyanatoethyl acrylate with 2-isocyanatoethyl methacrylate being most preferred. Preferably, such isocyanate polymers have a number average molecular weight ($M_n$) in the range from about 2,000 to about 50,000, more preferably from about 5,000 to about 20,000. Suitable methods for preparing said isocyanato esters are well known, e.g., as shown in U.S. Pat. Nos. 2,718,516 and 2,821,544 and British Pat. No. 1,252,099.

In addition to the aforementioned isocyanatoalkyl esters, it is often advantageous to employ blocked isocyanatoalkyl esters wherein the isocyanate groups of said esters are blocked with certain blocking agents such as phenols, lactams, active methylenes, alcohols, esters, mercaptans, acid amides, imides, amines, imidazoles, N-hydroxyimides, ureas, imines, oximes, sulfites and other conventional isocyanate blocking agents, e.g., as described in U.S. Pat. No. 4,099,638. Preferred blocking agents include methylethyl ketone-oxime, $\epsilon$-caprolactam and methyl salicylate. Such blocked isocyanates are particularly useful in the preparation of single package systems wherein the epoxy resin and isocyanate (blocked) polymer are premixed with a conventional organometallic urethane catalyst such as dibutyl tin dilaurate and can be stored for long periods. This curable composition is cured when desired by heating to a temperature (e.g., from about 75° to 200° C.) at which the blocking agent is removed from the isocyanate (deblocked).

Exemplary comonomers employed in the copolymers of the aforementioned isocyanato esters are primarily aliphatic comonomers such as the alkyl esters of $\alpha,\beta$-ethylenically unsaturated carboxylic acids including the acrylate and methacrylate esters, e.g., methyl acrylate and methacrylate, ethyl acrylate, butyl acrylate, cyclohexyl acrylate and the like; ethylenically unsaturated nitriles such as acrylonitrile; vinyl esters of saturated carboxylic acids such as vinyl acetate; ethylenically unsaturated carboxylic acids such as acrylic acid, methacrylic acid, fumaric acid, maleic acid, itaconic acid as well as half esters of the aforementioned unsaturated dicarboxylic acids, and similar copolymerizable ethylenicaly unsaturated aliphatic monomers. While not generally desirable, it is possible to use as much as 30 weight percent of an aromatic comonomer such as styrene, vinyltoluene, t-butyl styrene and the like in the aforementioned copolymers. In some polymers, it is found that up to 5 weight percent of vinyl aromatic comonomer stabilizes the polymer against degradation by light, etc.

The monomer constituency of the isocyanate polymers employed in the present invention is not particularly critical provided that the polymer contains at least two of the isocyanate groups per polymer molecule. Preferably, however, the isocyanate polymer contains from about 1 to about 100, most preferably 5 to 90, weight percent of the isocyanatoalkyl ester comonomer wherein the isocyanate groups may be blocked and from about 99 to about 0, most preferably 95 to 10, weight percent of other comonomers.

The isocyanate polymer is preferably prepared by subjecting a solution of monomer(s) under an inert atmosphere and in the presence of a free-radical generating initiator to elevated temperatures while agitating the polymerization recipe. Suitable solvents for the polymerization include ethyl acetate, 2-ethoxyethyl acetate, toluene and blends thereof with 2-ethoxyethyl acetate being preferred. The polymerization temperature may range from 60° to about 170°, with 80° to about 130° C. being preferred and 100° to 115° C. being most preferred. Exemplary free-radical generating initiators include azo compounds such as azobisisobutyronitrile; peroxygen compounds such as t-butyl peroxide, benzoyl peroxide and cumyl peroxide; and the like.

The curable composition of the present invention is generally prepared as a solution in a volatile, inert organic solvent. A variety of solvents may be used since the invention is not dependent upon any unique solvent or solvent system. Usually, the choice of solvent is determined by the coating requirement, application requirement, resin compatibility, solvent evaporation rate, viscosity, affect of solvent on the physical properties of the coating, cost and the like. Suitable solvents include aromatics such as xylene or toluene; ketones such as methyl ethyl ketone and methyl isobutyl ketone; esters such as ethyl acetate and 2-ethoxyethyl acetate and others which are inert to the isocyanate groups and epoxy groups present in the composition. The proportion of the isocyanato polymer to the epoxy resin in the composition is not particularly critical so long as there is sufficient isocyanate polymer to cure the composition to a water- and hydrocarbon-insoluble solvent. Preferably, the epoxy resin coating composition contains from about 0.4 to about 1.1 equivalents of isocyanate polymer per equivalent of the active hydrogen in the epoxy resin, most preferably from about 0.8 to about 1 equivalent.

In the curable composition, the proportions of epoxy resin and isocyanate polymer are preferably such that the cured composition is essentially free of unreacted isocyanate and is sufficiently insoluble to exhibit the desired solvent resistance. Preferably, the weight ratio of epoxy resin to isocyanate polymer is from about 1:9 to about 4:1, most preferably from about 1:1 to 1:2. Alternatively expressed, the composition comprises (1) from about 5 to about 80, preferably from about 10 to about 80, most preferably from about 30 to about 50, weight percent of epoxy resin; (2) from about 5 to about 90, preferably from about 20 to about 90, most preferably from about 50 to about 70, weight percent of the isocyanate polymer and (3) a catalytic amount of a urethane catalyst. The curable composition may vary considerably in solids content, for example, from about 10 to about 100 weight percent solids based on the composition, preferably from about 40 to about 80 weight percent. Such compositions are optionally formulated with pigments, dyes, inert fillers such as clay, plasticizers, antioxidants, stabilizers, catalysts and the like.

Methods of applying the coatings include such conventional methods as spraying, brushing, dipping, flowing or roller coating. The coatings may be air dried at ambient temperatures or may be baked by conventional methods to harden and crosslink (cure) them. Curing times and temperatures are not particularly critical, with conditions from air drying at ambient temperatures for several days to baking for a few minutes at elevated temperatures up to about 200° C. Preferably, such coating compositions are cured by baking at temperatures from about 70° to about 180° C. for 10 minutes to an hour, most preferably about 100° to about 180° C. for 15 minutes. When a blocked isocyanate is employed, the conditions of curing are sufficient to cause the isocyanate to deblock.

Most preferably, the composition is cured in the presence of an organometallic urethane catalyst such as tin octoate, lead octoate and the like. Such catalysts are employed in catalytic amounts, usually from about 0.01 to about 5 weight percent, preferably from about 0.1 to about 2 weight percent, based on the coating composition.

The following examples are given to illustrate the invention but should not be construed as limiting its scope. All parts and percentages are by weight unless otherwise indicated.

EXAMPLE 1

Preparation of Isocyanate Polymer

Into a 3-necked, 500 ml round bottom flask equipped with an addition funnel, condenser and stirrer is added 100 g of 2-ethoxyethyl acetate (EEA). To the addition funnel is added a mixture of 35 g of ethyl acrylate, 35 g of methyl methacrylate, 30 g of 2-isocyanatoethyl methacrylate (IEM) and 1 g of azobis(isobutyronitrile) (AZO). The solvent in the flask is warmed to 115° C. after which the monomers are added dropwise over a two-hour period to the reaction vessel. Thereafter, the reaction mixture is held at 115° C. with stirring for a three-hour post reaction period. Preferably, during the post reaction period, an additional 0.25 g of AZO is added to the reaction mixture. The resulting reaction mixture contains 49.09 weight percent of polymer solids wherein the polymer has a number average molecular weight of about 20,000 and contains 8.05 weight percent of isocyanate.

Preparation of Epoxy Resin Coating Composition

A 10-g portion of a 40 weight percent solids solution of epoxy resin (epoxy resin derived from bisphenol-A and epichlorohydrin which has about 2.5 repeating units per polymer molecule, an epoxide equivalent weight range of 475–575 and a hydroxy equivalent weight range of 405–445) in a mixture of 50 percent of EEA and 50 percent of methyl isobutyl ketone is combined with 10.16 g of the aforementioned isocyanate copolymer solution to provide a NCO:OH molar ratio of 1:1. To this solution is added a 24 percent solution of lead octoate in EEA in an amount sufficient to provide 0.4 percent of lead octoate based on the total weight of epoxy resin and isocyanate copolymer. The coating formulation thus prepared is mixed and applied using a wire-wound rod on a steel panel. The coating, having a thickness of 0.8721 mm is baked at 100° C. for 15 minutes. The panel is tested for physical properties immediately after the coating is cured and at subsequent intervals of exposure to simulated sunlight and other weathering conditions. The weathered panels exhibit good physical properties as indicated in Table I and exhibited no yellowing or chalking after 1000 hours of exposure to simulated sunlight and other weathering conditions.

TABLE I

| Sample No. | Exposure Time, hrs. (1) | Hardness (2) | Solvent Resistance (3) | Toughness In-Lb(4) | % Adhesion Loss(5) | Gloss (60°)(6) |
|---|---|---|---|---|---|---|
| 1 | 0 | 4H | >100 MEK | 8 | <1 | 90 |
| 2 | 1000 | 6H | >100 MEK | 4 | 2 | 90 |

(1) Time in hours that the coated panel is exposed to a xenon lamp of a Weather-O-Meter manufactured by Atlas Electric Devices Co.
(2) Hardness measured by pencil hardness test with rating indicating the hardest pencil that does not scratch the coating surface.
(3) Solvent resistance measured by double rubs with a 9.8 g ballpeen hammer covered with cheesecloth and soaked with methyl ethyl ketone.
(4) Toughness measured by a Gardner impact tester with the rating being the greatest number of inches that a 1 lb weight can be dropped onto the reverse side of a coated panel (0.635 mm) without rupturing the coating.
(5) Cross-hatch adhesion test wherein the coating is scribed by a razor blade in a 1 in² cross-hatch pattern and a pressure sensitive adhesive tape (Scotch ® Filament Tape - 1.9 cm Wide - No. 893-2) is applied and pressed onto the cross-hatched region of the coating and then removed. The percentage adhesion loss represents the area of the coating removed divided by the area of the coating wherein the tape is applied.
(6) ASTM D-1455.

EXAMPLE 2

Following the procedure of Example 1, a blocked isocyanate polymer is prepared by copolymerizing a mixture of 35 g of ethyl acrylate, 35 g of methyl methacrylate and 52 g of a blocked IEM represented by the formula:

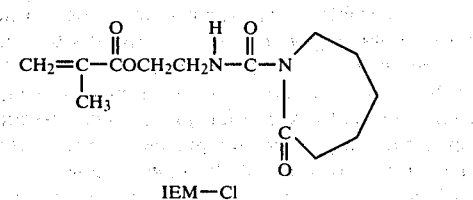

IEM—Cl in 100 g of EEA containing 1 g of AZO. The resulting reaction mixture contains 54 weight percent of polymer solids wherein the polymer (1) has a number average molecular weight of ~20,000 and (2) contans 42.6 weight percent of the blocked isocyanate in polymerized form.

A 15.0-g portion of the solution of epoxy resin used in Example 1 is combined 19.5 g of the aforementioned blocked isocyanate copolymer solution to provide a NCO:OH molar ratio of 1:1. To this solution is added a 24 percent solution of lead octoate in EEA in an amount sufficient to provide 0.4 percent of lead octoate based on the total weight of epoxy resin and blocked isocyanate copolymer. The coating formulation is then applied to panels and tested by the procedures described in Example 1 and the results of the tests are recorded in Table II.

For purposes of comparison, other blocked isocyanate copolymers are similarly prepared and employed in coatings as described hereinbefore. These coatings are also tested and the results are reported in Table II.

TABLE II

| Sample No. | Blocked Isocyanate Copolymer(7) | Coating Thickness, mm | Exposure Time(1), hrs | Hardness(2) | Solvent Resistance(3) | Toughness (4), In-Lbs. | Adhesion Loss(5), % | ΔYI(6) |
| --- | --- | --- | --- | --- | --- | --- | --- | --- |
| 1 | EA/MMA/IEM-Cl 35/35/30 | 0.9 | 168 | 7H | 100 | 4 | 0 | 28.2 |
| 2 | EA/MMA/MIEM 35/35/30 | 0.8 | 168 | 7H | 190 | <4 | 0 | 29.1 |
| 3 | EA/MMA/IEM-Cl 35/35/30 | 0.9 | 168 | 4H | 107 | <4 | 0 | 35.3 |

(1)-(5) Same as in Table I.
(6) ΔYI - Yellowness index determined after 1000 hrs. exposure time in accordance with ASTM D-1925-70.
(7) EA - ethyl acrylate
MMA - methyl methacrylate
MIEM - 2-isocyanatoethyl methacrylate blocked with methyl ethyl ketone oxime
IEM-Cl - 2-isocyanatoethyl methacrylate blocked with ε- caprolactam.
The number set forth below the monomeric components indicate weight percentages of said components.

EXAMPLE 3

Using the isocyanate copolymer and the epoxy resin of Example 1 and the procedure of Example 1 except that the isocyanate copolymer and epoxy resin are used in proportions sufficient to provide 0.4 equivalent of isocyanate moiety per equivalent of hydroxyl moiety, a coated panel is prepared and tested for solvent resistance and gloss. The coated panel is then exposed for 1000 hours to the xenon lamp described in Table I and again tested for gloss. The results are as follows:

| Solvent Resistance: 40MEK (Test (3) of TABLE I) | |
| --- | --- |
| Gloss (60°): (Test (6) of Table I) | Before Exposure 100 After Exposure 90 |

What is claimed is:

1. A curable composition comprising (1) an epoxy resin containing at least two active hydrogen groups per molecule and (2) an addition polymer having a carbon-to-carbon polymeric backbone bearing at least two isocyanatoalkyl ester groups per molecule, said resin and polymer being present in proportions such that, upon exposure of the composition to conditions sufficient to cause the reaction of the isocyanate groups of the polymer with the active hydrogen groups of the resin, the composition cures to a water- and hydrocarbon-insoluble solid.

2. The composition of claim 1 comprising (1) from about 5 to about 80 weight percent of the epoxy resin, (2) from about 5 to about 90 weight percent of a copolymer of an alkyl ester of acrylic or methacrylic acid and an isocyanatoalkyl ester of acrylic or methacrylic acid and (3) a catalytic amount of a urethane catalyst.

3. The composition of claim 1 wherein the epoxy resin is the reaction product of bisphenol-A and epichlorohydrin; the polymer is a copolymer of ethyl acrylate, methyl methacrylate and 2-isocyanatoethyl methacrylate; and the catalyst is lead octoate.

4. The composition of claim 1 wherein the isocyanato group of the isocyanatoalkyl ester are blocked with an isocyanate blocking agent.

5. The composition of claim 4 wherein the blocking agent is methylethyl ketone-oxime, ε-caprolactam or methyl salicylate.

6. A method for coating a substrate which comprises applying to a substrate a coating formulation which comprises the curable composition of claim 1 and subjecting the resulting coated substrate to conditions sufficient to cause the reaction of the isocyanate groups of the polymer with the active hydrogen groups of the resin.

7. The composition of claim 1 which has been cured to a water- and hydrocarbon-insoluble solid.

* * * * *

UNITED STATES PATENT AND TRADEMARK OFFICE
CERTIFICATE OF CORRECTION

PATENT NO. : 4,264,748

DATED : April 28, 1981

INVENTOR(S) : Sharon L. Oriel et al.

It is certified that error appears in the above—identified patent and that said Letters Patent is hereby corrected as shown below:

In the abstract, line 2, delete the second "and" and insert -- an --.

Column 2, line 24, delete the second "and" and insert -- or --.
Column 3, line 58, "ethylenicaly" should read -- ethylenically --.
Column 6, line 49, "contans" should read -- contains --.

Signed and Sealed this

Twenty-fourth Day of November 1981

[SEAL]

Attest:

GERALD J. MOSSINGHOFF

Attesting Officer     Commissioner of Patents and Trademarks